Jan. 8, 1952        W. E. SMITH        2,581,562
FILLING MECHANISM FOR AUTOMATIC WEIGHING MACHINERY
Filed Aug. 16, 1949
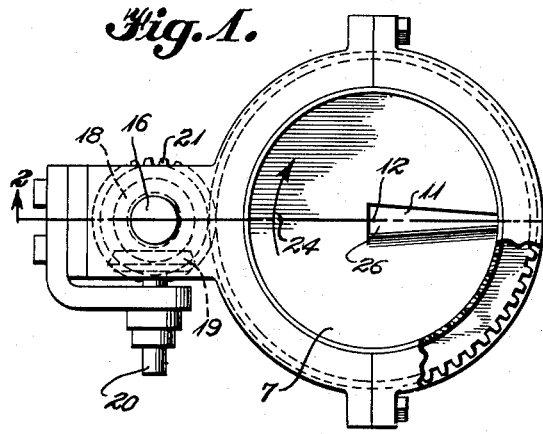
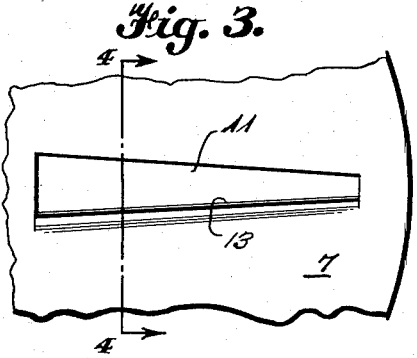
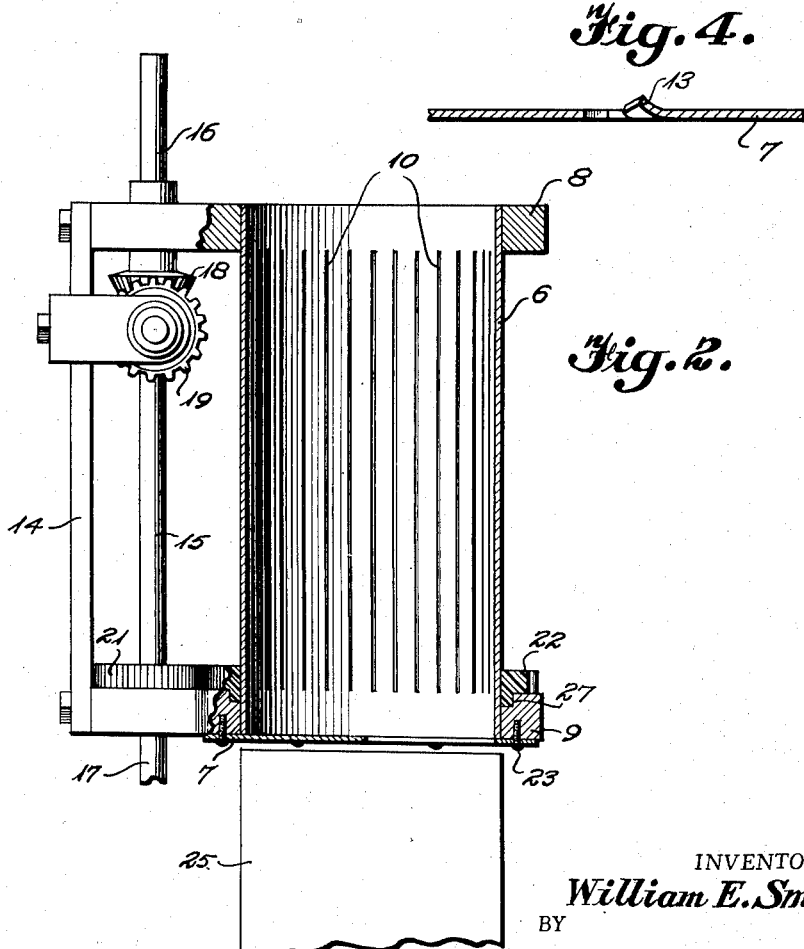
INVENTOR.
William E. Smith
BY
George Lynn DeMott
ATTORNEY Patented Jan. 8, 1952

2,581,562

UNITED STATES PATENT OFFICE 2,581,562

FILLING MECHANISM FOR AUTOMATIC WEIGHING MACHINERY

William Edward Smith, Milltown, N. J.

Application August 16, 1949, Serial No. 110,501

3 Claims. (Cl. 222—162)

This invention relates to filling mechanism for automatic weighing machinery, and particularly to filling mechanism for viscous mixes which contain lard, "Crisco" and the like characterized by their frequent and unpredictable variations in density and viscosity.

Automatic weighing machinery is in a highly developed state, so far as the weighing of fluent materials is concerned, but the automatic weighing of paste-like materials such as shortening mixes has up to the present time been unsatisfactory. The material varies substantially in density not only between different mixes but also under different conditions of temperature and humidity affecting a given mix. Hence filling mechanism for these mixes, so far devised, has offered great difficulty and has required careful readjustment for each new condition, in order to achieve even reasonably satisfactory operation. Furthermore, such mechanism as has been used has required that the filling device be considerably spaced from the container to be filled, and that a funnel be used. As a consequence of this spacing, some material may be in transit between the hopper of the filling machine and the container, after the weighing machine trip has operated to cut off the feed. The result is to overfill the container.

The present invention is concerned with a filling mechanism capable of handling shortening mixes effectively, and completely overcomes the prior art difficulties. Not only is the feeding accurate in spite of variations in density, but also the use of a funnel between the filling hopper and the container to be filled is no longer necessary since the container may be placed in close proximity to the discharge end of the hopper. By "close proximity" is meant a spacing of as little as one-eighth of an inch.

Accordingly the main object of the invention is to provide a filling mechanism capable of accurate feeding in spite of variations in the density and viscosity of the mix being fed.

Another object of the invention is to provide a device in which the rate of feed can be changed by a predetermined and precise amount by the replacement of a single part of the device.

Still another object is to provide a device which can be driven by means located in any one of three planes, so as to make the device capable of extreme flexibility in use.

Numerous other objects and advantages of the invention will be apparent from the following specification, when it is read in conjunction with the accompanying drawings, in which:

Figure 1 is a top plan view of a preferred embodiment of the invention;

Figure 2 is a vertical section on line 2—2 of Fig. 1;

Figure 3 is a partial plan view, on a greatly enlarged scale, of an orifice plate which forms an important element of devices embodying the invention; and Figure 4 is a section on line 4—4 of Fig. 3.

Referring to the drawings, the reference character 6 designates the hopper of the mechanism, closed at the bottom by an orifice plate 7 and capable of rotation in annular top and bottom supports 8 and 9, respectively. The hopper 6, as shown, is cylindrical in form and its wall contains a series of closely spaced areating slots 10, extending substantially from top to bottom of the cylinder. The interior of the cylinder is completely free and unobstructed, and the orifice plate 7 carried by the support 9 and forming the bottom of the hopper contains a wedge-shaped discharge orifice 11 extending radially and having its wider end extending slightly beyond the middle 12 of the plate. The metal along one side of the orifice is upturned at the wide end of the slot to form a lip 13. The location and the size of the orifice and of the lip are important as will be pointed out hereinafter.

The top and bottom supports 8 and 9, each preferably made in two parts bolted together as indicated, are secured to an upright 14 and are arranged to provide bearings for a vertical drive shaft 15. This shaft may be driven directly by attaching drive means above the support 8 as at 16, or below support 9 as at 17. The shaft 15 also carries a bevel gear 18 which may be driven from an intermeshing bevel gear 19 having a horizontal stub shaft 20. The drive between shaft 15 and hopper or cylinder 6 is completed by a spur gear 21 on the shaft, and an intermeshing gear 22 fixedly attached to the lower end of the cylinder and journaled in the stepped portion 27 of support 9. The orifice plate 7 is fixed to the bottom of support 9 by means such as the screws 23, permitting the ready substitution of plates with orifices of different sizes.

It will be clear from the above that when shaft 15 is driven either from above or below or from shaft 20, the hopper will rotate with respect to the supports 8 and 9 and the orifice plate 7. When this hopper is filled with shortening and driven in the direction indicated by the arrow 24 in Fig. 1, the mix will be moved by engagement with the edges of slots 10 and will settle through the slot 11 being cut off by upstanding lip 13 and discharged into the container 25. The slots 10 permit air to permeate the mix and facilitate its settling to the bottom of the hopper.

The location and size of the slot 11 and the lip 13 are critical and control the discharge rate of material from the hopper. For best results the inner end of the slot, as at 26, should extend slightly past the center 12 of the plate. The size of the slot 11 and the height of the lip 13 control the rate of discharge from the hopper, that is the larger the slot or the higher the lip, the faster the discharge.

While the structure has been illustrated with the cylinder or hopper 6 rotatable and the orifice plate 7 fixed, this is not essential provided there is relative movement between the two parts. In other words, the device will operate effectively with the cylinder fixed and the orifice plate rotating, and such a structure is contemplated.

While it has been indicated that the container illustrated at 25 will normally be carried by the arm of an automatic weigher, the application of the invention is not limited strictly to such use, but is intended for use wherever accurate feeding of viscous mixes is desirable or necessary. Consequently, the invention is intended to be limited only when the prior art makes it necessary.

Having thus described the invention, I claim:

1. A discharge mechanism for viscous mixes comprising a hollow cylindrical container having a series of closely spaced narrow slots in its wall, an orifice plate abutting the lower end of said container and having a radial slot therein, said slot being wedge-shaped and the base of the wedge extending past the center of said plate, an upturned lip on one side of said wedge-shaped slot, and means for producing relative rotation between the container and plate.

2. A filling mechanism for delivering viscous mix to an automatic weighing machine, comprising a pair of vertically spaced annular supports, a circular plate supported in the lower one of said supports, said plate having a radial wedge-shaped slot therein extending from approximately the center of said plate to the periphery thereof and with the wider portion of the slot adjacent to the center of the plate, an upturned lip on one side of said wedge-shaped slot, a cylindrical hopper open at the top and bottom and resting on said plate, the wall of said hopper containing a series of vertical slots, and the top of the hopper being supported in the upper one of said supports, means for holding said supports in spaced relation, and means carried by said holding means for producing relative rotation between said hopper and said plate to cause discharge of material from said orifice.

3. A constant discharge hopper for viscous mixes comprising a pair of spaced annular supports, means for holding said supports in spaced relation, a disc carried in the bottom one of said supports, said disc having a wedge-shaped radial slot therein extending from the periphery to a point slightly beyond the center of the disc, and with the wider portion of the slot adjacent said center, a hollow cylinder supported between said supports and resting on said plate, the wall of said cylinder being vertically slotted, a gear carried by the cylinder, a drive shaft extending between said supports, and gear means carried by said shaft and intermeshing with the gear on said cylinder for producing relative rotation between the cylinder and plate when said shaft is driven.

WILLIAM EDWARD SMITH.

REFERENCES CITED

The following references are of record in the file of this patent:

UNITED STATES PATENTS

| Number | Name | Date |
|---|---|---|
| 234,079 | Sheldon et al. | Nov. 2, 1880 |
| 1,066,281 | Keith | July 1, 1913 |
| 2,475,463 | Santo | July 5, 1949 |